Patented Apr. 11, 1950

2,503,710

UNITED STATES PATENT OFFICE 2,503,710

METHOD FOR MAKING 1-CYANO-1,3-BUTADIENE

Herman A. Bruson, Rydal, Pa., assignor, by mesne assignments, to Rohm & Haas Company, Philadelphia, Pa., a corporation of Delaware No Drawing. Application January 24, 1948, Serial No. 4,211

2 Claims. (Cl. 260—465.9)

This invention deals with a method for preparing 1-cyano-1,3-butadiene, $$CH_2=CH-CH=CH-CN$$

and relates more particularly to a method whereby it may be obtained from 1-cyano-2-hydroxy-3-butene, $CH_2=CH-CHOH-CH_2CN$, by catalytic dehydration.

It is already known that 1-cyano-1,3-butadiene can be obtained by pyrolysis of esters of acetaldolcyanohydrin or of esters of crotonaldehyde cyanohydrin (U. S. Patents Nos. 2,264,025 and 2,264,026). It has also been obtained by reacting 4-chloro-1,2-butadiene, $CH_2=C=CH-CH_2Cl$, with sodium cyanide (Coffman, Jour. Amer. Chem. Soc. 57, 1981 (1935)). When made by any of these prior methods either the yields are low or the product is contaminated with deleterious by-products which are difficult to remove.

According to the present invention, pure 1-cyano-1,3-butadiene is obtained in good yields by simply heating 1-cyano-2-hydroxy-3-butene in the presence of a small amount of a fixed alkali or alkaline reacting catalyst which is appreciably soluble in water. Typical catalysts which are effective for this purpose are the oxides, hydroxides, carbonates, cyanides, alcoholates, phenates, and phosphates of sodium or potassium; furthermore, barium hydroxide or calcium hydroxide are effective.

Advantageously, the catalytic dehydration is best carried out in the liquid phase under reduced pressure and preferably in the presence of an inert carrier gas, such as nitrogen, and an anti-polymerization agent, such as beta-naphthol or resorcinol. Temperatures of 125° C. to 200° C. constitute the preferred range for effecting the dehydration.

The quantity of catalyst to be used can be varied over a wide range, amounts of from about 1% to about 5% on the weight of the 1-cyano-2-hydroxy-3-butene being ample and effective, although larger amounts may be used.

Although the distillation and dehydration in the liquid phase can be carried out at ordinary atmospheric pressure, the yields of 1-cyano-1,3-butadiene are considerably increased by carrying out the distillation under a reduced pressure so chosen and maintained that the 1-cyano-1,3-butadiene which forms distils over with the water as fast as formed but the unchanged 1-cyano-2-hydroxy-3-butene runs back into the dehydration zone without distilling over.

The following examples illustrate this invention.

Example 1

A mixture of 100 grams of 1-cyano-2-hydroxy-3-butene (obtainable from butadiene chlorohydrin and sodium cyanide), 3 grams of powdered potassium carbonate, and 1 gram of hydroquinone is distilled under reduced pressure at 100 mm. of mercury. At a pot temperature of 125°–135° C., water and 1-cyano-1,3-butadiene distil over between 60° and 80° C. (vapor temperature). The distillate is collected in an ice-cooled receiver. It consists of 13 grams of water and 58 grams of practically pure 1-cyano-1,3-butadiene. Upon redistillation, the latter boils at 60° C. (45 mm.). The yield is 60–70% of theory.

Example 2

A mixture of 100 grams of 1-cyano-2-hydroxy-3-butene, 3 grams of powdered potassium cyanide, and 1 gram of beta-naphthol was distilled under reduced pressure (80–120 mm.) in an atmosphere of nitrogen. Water and 1-cyano-1,3-butadiene were evolved when the pot temperature reached 125–130° C. The yield of pure 1-cyano-1,3-butadiene was 53 grams.

It will be noted in the above examples that the temperature required for the catalytic dehydration to take place is quite low. With calcium hydroxide, barium hydroxide, or trisodium phosphate a pot temperature somewhat higher is required for initiation of the dehydration, a pot temperature range of 165°–200° C. being desirable with these catalysts.

Because of the low temperatures employed in the present process, the product is not contaminated with harmful by-products and polymerization losses are reduced to a minimum. This product is particularly useful for the preparation of rubber-like materials.

I claim:

1. A method for preparing 1-cyano-1,3-butadiene which comprises dehydrating 1-cyano-2-hydroxy-3-butene by heating it in the presence of about 1% to 5% of the weight thereof of a catalyst which is a member of the class consisting of the oxides, hydroxides, carbonates, cyanides, alcoholates, phenates, and phosphates of sodium and potassium, and the hydroxides of calcium and barium, said heating being done under reduced pressure at a temperature which is between 125° and 200° C. and at which the 1-cyano-1,3-butadiene resulting from the dehydrating reaction distils from the mixture of catalyst and 1-cyano-2-hydroxy-3-butene.

2. A method for preparing 1-cyano-1,3-butadiene which comprises dehydrating 1-cyano-2-hydroxy-3-butene by heating it in the presence of about 1% to 5% of the weight thereof of a catalyst which is a member of the class consisting of the oxides, hydroxides, carbonates, cyanides, alcoholates, phenates, and phosphates of sodium and potassium, and the hydroxides of calcium and barium, the heating of the mixture of said butene and catalyst being done at a pressure below atmospheric and at a temperature between 125° and 200° C., and separating 1-cyano-1,3-butadiene by distilling it from said mixture at a temperature at which 1-cyano-2-hydroxy-3-butene remains behind.

HERMAN A. BRUSON.

REFERENCES CITED

The following references are of record in the file of this patent:

UNITED STATES PATENTS

| Number | Name | Date |
|---|---|---|
| 2,264,025 | Gudgeon et al. | Nov. 25, 1941 |
| 2,334,192 | Hanford | Nov. 16, 1943 |
| 2,375,005 | Kung | May 1, 1945 |
| 2,392,303 | Balcar | Jan. 8, 1946 |
| 2,432,511 | Davis et al. | Dec. 16, 1947 |
| 2,452,554 | Davis et al. | Nov. 2, 1948 |
| 2,461,492 | Carpenter et al. | Feb. 8, 1949 |